DOPED STRONTIUM HALIDE PHOSPHOR AND DEVICE FOR INFRARED TO VISIBLE LIGHT CONVERSION
Filed Sept. 19, 1969

INVENTOR
RODERICK K. WATTS

United States Patent Office 3,623,907

Patented Nov. 30, 1971

3,623,907

DOPED STRONTIUM HALIDE PHOSPHOR AND DEVICE FOR INFRARED TO VISIBLE LIGHT CONVERSION

Roderick K. Watts, Dallas, Tex., assignor to Texas Instruments Incorporated, Dallas, Tex.

Filed Sept. 19, 1969, Ser. No. 859,251
Int. Cl. B44d *1/02*
U.S. Cl. 117—224 38 Claims

ABSTRACT OF THE DISCLOSURE

Strontium chloride ($SrCl_2$) is doped with approximately 20% ytterbium (Yb) and approximately 1% of either erbium (Er) or holmium (Ho) and applied to the surface of a gallium arsenide:silicon doped diode. When the diode is energized, the infrared energy which is emitted is converted to visible light by the doped strontium chloride phosphor.

Figure 1A:
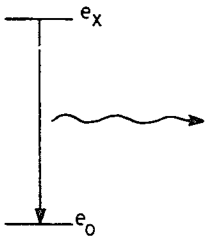

This invention relates generally to the conversion of infrared to visible light, and more particularly to an improved phosphor host material for coating an infrared light emitting diode to produce visible light.

There are many applications for devices which will convert infrared radiation into visible radiation. Such devices known as quantum counters, have been used in the past as infrared radiation detectors to produce indications of object and personnel movement in the dark.

More recently, however, it has been suggested that the principle of infrared to visible light conversion can be employed in the construction of solid state light sources which may be used, for example, as indicator lights on a display panel.

A diode constructed of gallium arsenide which has been doped with silicon radiates electromagnetic energy having a wavelength of from 9200 to 9600 angstrom units when current flows through the diode. That is, when a gallium arsenide diode is energized, it produces infrared light having a wavelength on the order of 9300 A. Since the human eye is virtually insensitive to infrared radiation in this range the infrared light must first be converted to a wavelength which can be perceived by the human eye before the light from the diode can be used as an indicator signal.

It is known that by coating the surface of a gallium arsenide diode with a crystalline phosphor material which has been doped with ions of a trivalent rare earth material, the phenomenon of energy transfer is used to convert the infrared energy produced by a gallium arsenide diode to visible light. That is, the infrared energy from the gallium arsenide diode is used to excite the electrons of rare earth ions contained within a host phosphor crystalline material into a higher energy state. The excited electrons of the rare earth material have a tendency to return to a lower, more stable energy state and in doing so will emit radiation having a frequency indicative of the energy lost by an electron in its transition back to the ground state. By properly selecting the rare earth materials, light radiation of various frequencies can be produced.

The selection of the proper phosphor crystal material to be used as a host material for the rare earth ions, is very important in obtaining maximum efficiency in the conversion of infrared to visible light. The field of the host crystal exerts a great influence over the characteristics of the rare earth ions and the use of various crystal materials may change such parameters as energy transition probabilities, fluorescent life times, fluorescent quantum efficiencies and the efficiency with which energy is transferred. Moreover, a host material should be selected so that there is a sufficient energy level mismatch between different rare earth dopants to require phonon-assisted energy transfer. A material should be chosen so that the vibrational frequencies an dselection rules for phonon-assisted transitions permit efficient energy transfers and at the same time do not limit the life time of the intermediate or final states. The present invention relates to a novel phosphor host material for rare earth ions.

One host crystal material which has been employed in the prior art is that of lanthanum trifluoride ($LaF_3$) which has been doped with ytterbium and erbium to produce a visible green light when subjected to infrared radiation from a gallium arsenide diode. Other host phosphor materials which have been used are yttrium oxychloride (YOCl) and barium yttrium fluoride ($BaYF_5$), both of which are doped with ytterbium and either erbium or holmium. Each of these phosphor crystal materials, however, have relatively energetic phonons and consequently a relatively high likelihood of radiationless energy transitions which results in less efficient luminescence characteristics. A phosphor material having heavier atoms has a smaller likelihood of radiationless energy transition and is therefore a more efficient radiator. An object of this invention is to provide a host phosphor crystal material capable of providing a highly efficient conversion of infrared energy to visible radiation.

The present invention relates to an improved phosphor crystalline material to be used as a host material for rare earth ions. The improved material, when doped with rare earth ions, is capable of providing a more efficient conversion of infrared to visible radiation.

Figure 1B:
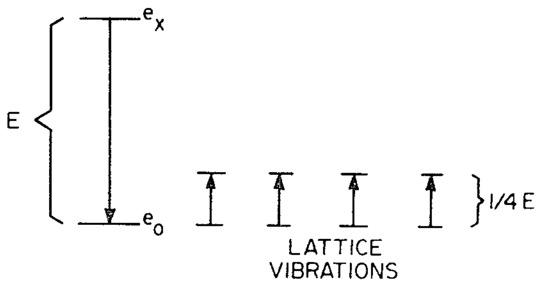
Figure 1C:
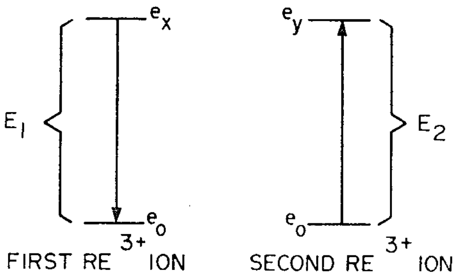
Figure 2A:
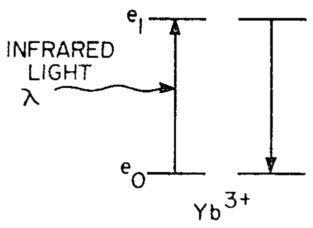
Figure 2B:
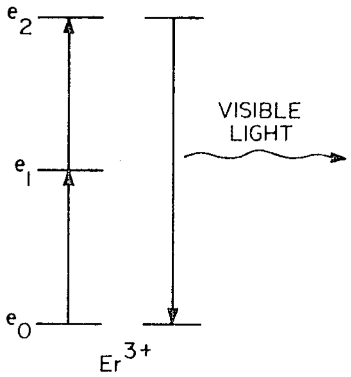
Figure 3:
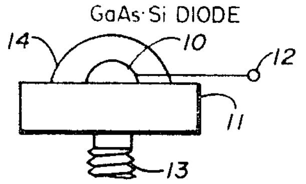

The novel features believed characteristic of this invention are set forth in the appended claims. The invention itself, however, as well as other objects of advantages thereof, may best be understood by reference to the following detailed description of an illustrative embodiment, when read in conjunction with the accompanying drawings, wherein:

FIG. 1*a* is a simplified illustration of an electron energy transition in which radiation is given off;

FIG. 1*b* is a simplified illustration of an electron energy transition wherein energy is given up in the form of a plurality of lattice vibrations;

FIG. 1*c* is a simplified illustration of an electron energy transition in which a first electron of a rare earth ion goes from a high energy state to a low energy state by transferring energy to a second electron of a rare earth ion raising the second electron from a low energy state to a higher energy state;

FIG. 2*a* is a simplified illustration of the manner in which ytterbium electrons may be raised from a ground energy state to a higher energy state by the absorption of a photon of infrared energy and then fall to the ground energy state again by giving up its energy to an electron of an erbium ion, as illustrated in FIG. 2*b*;

FIG. 2*b* is a simplified illustration of the manner in which an electron of an erbium ion is raised through two successive higher energy states by absorption of energy from the electrons of one or two ytterbium ions and then the manner in which the energy level of the erbium electron returns to the ground state by giving off visible radiation; and FIG. 3 is a schematic diagram of a gallium arsenide: silicon doped diode which has been coated with a phosphor material in accordance with the invention in order to convert infrared energy produced by the diode to visible light.

Each one of the rare earth elements has ions which possess a large number of well-known energy levels due to the partially filled 4–f electron shell. The positions and energy values of these levels for the trivalent rare earth ions ($RE^{3+}$), such as ytterbium (Yb), erbium (Er) and holmium (Ho), are relatively insensitive and unvarying regardless of the host crystal into which the $RE^{3+}$ is doped.

When an electron is raised to an energy state $e_x$ above its ground level $e_o$, the electron will normally seek to return to its ground energy state by giving up the acquired energy in one or more of several different ways. The schematic illustrations shown in FIG. 1 are greatly simplified diagrams of three different ways in which an electron may progress from a higher energy state $e_x$ to its ground energy level $e_o$. In FIG. 1*a*, an electron which has been raised from its ground state $e_o$ to a higher energy state $e_x$ may return to the ground level by giving off a photon of radiation having an energy equal to the energy transition necessary to return the electron to the ground state $e_x - e_o$. The frequency of the radiation is determined by the energy given up and is related by the formula $E=h\nu$ where E is energy in ergs, $h$ is Planck's constant of $6.625 \times 10^{-27}$ erg seconds, and $\nu$ is frequency in Hertz. FIG. 1*b* illustrates that an electron may alternatively progress from a higher energy state $e_x$ to its ground state $e_o$ by giving up the quantity of energy E in the form of kinetic vibrations of the lattice structure of the ions. That is, the proper number of vibrations may occur so that the total energy of those vibrations, for example four vibrations at one-fourth E energy each, is equal to E, which is equal to $e_x - e_o$. FIG. 1*c* illustrates the manner in which a first electron of a rare earth ion $RE^{3+}$ may progress from a higher energy state $e_x$ to ground state $e_o$ and give up a quantity of energy $E_1$ in the process by transferring that energy to a second electron of a rare earth ion $RE^{3+}$. The effect of this transfer raises the energy level of the second electron from its ground state $e_o$ by an amount $E_2$ to a higher energy state $e_y$. The two electrons, in effect simply trade energy.

The occurrence of all three of the different energy transition processes shown in FIG. 1, may be possible with different probabilities in a given situation. For example, the more lattice vibrations which would be required in a transition as shown in FIG. 1*b* in order to return the excited electron to the ground state, the less probable that energy transition by this mechanism becomes. Similarly, the greater the difference between the energy levels $E_1$ and $E_2$ in the illustration of FIG. 1*c*, the less likely such a transfer between two different electrons of $RE^{3+}$ ions become. However, in a FIG. 1*c* transition, there could be such an energy transfer between electrons with a lattice vibration occurring equal to the difference between the energies $E_1$ and $E_2$. It can also be seen that a transition from a higher energy state to a ground state takes place in which any and all combinations of the different types of energy transitions shown in FIG. 1 may occur. A complete change from a high energy state to ground state may involve an energy transfer between two electrons, the production of lattice vibrations, as well as the emission of a photon.

In the known systems for converting infrared light to visible radiation, a mixture of ions of two different types of rare earths is used. One type of ion converts the infrared energy into excitation of its electrons. The increase in electron energy by the first type of rare earth ion is then transferred from an ion of the first type of rare earth material to an ion of the second type of rare earth material through the process illustrated in FIG. 1*c*. The electrons in the ions of the second rare earth material are then at a metastable increased energy level. The electrons of the second ion again absorbs energy from the first rare earth ion and the electrons in the second ion are raised to a second unstable level. The energy of the electrons in the second ion then decays from the second unstable lebel all the way down to ground state $e_o$ by giving off visible radiation characteristic of this electron energy transition.

FIG. 2*a* gives a simplified illustration of the way in which an electron of an ytterbium ion absorbs infrared energy on the order of 9300 A. and thereby increases its energy level from the ground state $e_o$ to a first energy level $e_1$. The electron of the ytterbium ion then falls back to the ground state $e_o$ transferring its energy to an electron of an erbium ion, exciting it from the ground state $e_o$ to a first higher energy level $e_1$. The energy level $e_1$ is a metastable state for the electrons of an erbium ion and the excited electron remain at level $e_1$ long enough to be excited further. Another ytterbium ion electron which has absorbed infrared energy and gone from ground to state $e_1$ subsequently transfers its energy to the same electron of the erbium ion and thereby raises its energy level to a second higher energy state $e_2$. The energy $e_2$ is an unstable state for the electrons of an erbium ion and the electron seeks to give up its energy and return to ground state $e_o$. The excited electron of the erbium ion then falls from state $e_2$ back to the ground condition $e_o$ and in doing so gives up visible radiation having an energy indicative of the difference between the states $e_o$ and $e_2$. The radiation appears to an observer as a deep red light.

An electron energy transition similar to that between ytterbium and erbium as shown in FIG. 2 may take place with ytterbium and holmium in which the holmium electron decays from its second higher energy state back to the ground state and gives off a photon of electromagnetic energy having a visible green color. It is to be understood that the explanations of energy transfer and radiation involved are extremely oversimplified and are given in this manner purely as illustrations to demonstrate the operation of the present invention.

It is known that when a host crystal is doped with a first rare earth material such as ytterbium, the concentration is made as large as possible in order to "absorb" as much light from the infrared source as possible. The concentration of the second rare earth material, such as erbium, however, is limited by the energy transfer phenomenon illustrated in FIG. 1*c*. That is, as more and more erbium is present in the doped crystal, energy transitions will occur between neighboring erbium ions and they will simply "trade energy" rather than give up that energy in the form of radiation of visible light rays. Concentrations which are found useful, are 20% ytterbium and 1% erbium, given as the atomic percentage of the ions in the host material replaced by rare earths.

Inversion symmetry in a doped crystal structure is the condition where the environment of the rare earth ion is the same in one direction through the crystal as in the opposite direction through the crystal. When a rare earth material is present at a site of inversion symmetry in a crystal structure, electric dipole transitions of energy states cannot occur and very little light will be produced. For this additional reason the doping of a cubic host crystal with rare earth ions must be very heavy so that the cubic symmetry structure of the overall crystal arrangement is disturbed and electric dipole transitions may occur.

The characteristics of an efficient host phosphor material should include the ability to accommodate rare earth ions at low symmetry sites so that there is no inversion symmetry present; it must accommodate a fairly large concentration of doping of the rear earth ions; and the lattice vibration energies of the phosphor crystal material must be relatively small so that transitions such as are illustrated in FIG. 1*b* are less likely. In the host phosphor crystals which have been used in the past, the fluorine and oxygen compounds are relatively light and therefore are more likely to undergo energy transitions through lattice vibrations.

The host phosphor crystal of the present invention is a strontium halide and is preferably a compound of strontium chloride ($SrCl_2$). Since strontium and chlorine are heavier atoms than the lightest atom of the prior art phosphors, radiationless energy transfers are less likely.

A strontium chloride compound is prepared having the form $a\text{SrCl}_2;b\text{YbCl}_3:c\text{ErCl}_3$ in which the concentrations are on the order of $a=.79$, $b=.20$, and $c=.01$. Because the phosphor is hygroscopic and is capable of absorbing water from the air, the doped phosphor material is preferably mixed with a clear plastic. The encasing plastic material prevents water absorption and still freely passes the infrared radiation necessary to stimulate visible radiation emission by the phosphor. It is preferable to adjust the refractive index of plastic within which the phosphor material is encased so that the index of refraction of the plastic is equal to that of the phosphor in order to have the most efficient transmission of visible light. As shown in FIG. 3, a gallium arsenide diode 10 constructed upon a heat sink 11 having a pair of current leads 12 and 13 connected thereto is coated with a thick hemispherical layer 14 (approximately one millimeter in thickness) of the phosphor encased in a clear plastic. When the diode is energized to produce infrared radiation, the phosphor in turn converts the infrared radiation into visible light.

By way of an example, a doped phosphor material of the present invention was prepared in the following manner. A mixture of approximately 63 mg. of holmium oxide ($Ho_2O_3$), 1.66 gm. of ytterbium oxide ($Yb_2O_3$), and 4 gm. of strontium chloride ($SrCl_2$) is dissolved in hydrochloric acid and evaporated to dry. The resultant dry material is a hydrated mixture of the chlorides of holmium, ytterbium, and strontium which is then placed in a flowing stream of hydrogen chloride gas at around 1000° C. for approximately 3 hours to remove the water of hydration and melt the material. The material is cooled slowly and crushed to a powder and then placed in a tube and melted with a torch. The tube is connected to a vacuum pump which removes any remaining water vapor. After the material is melted by the torch, it is cooled rapidly. The doped phosphor material may then be crushed and mixed with a liquid epoxy resin which, after setting, forms a pellet and seals the phosphor exposure to water. A phosphor containing erbium is prepared as above by substituting the same quantity of erbium oxide ($Er_2O_3$) for holium oxide.

It is to be understood that the above is only an example and the material of the invention may be prepared by other techniques.

Various different mixtures of strontium chloride and rare earth metals may be prepared in accordance with the invention. It has been found that the preferred amount of yetterbium to be used in doping strontium chloride may range from about 10 atomic percent to 50 atomic percent of the composition while the most preferred amount of ytterbium is about 20 atomic percent. The preferred amount of erbium used may range from about 0.5 atomic percent to about 3.0 atomic percent of the composition while the preferred amount of holmium may range from about 0.1 atomic percent to about 1.5 atomic percent of the composition. The most preferred amounts of both erbium and holmium to be used, respectively, with strontium chloride is in the range of 1 atomic percent.

It has also been found that the preferred range of amounts of ytterbium and erbium should be present in the composition in the ratio of from about 100 to 1 to about 10 to 1 while the amounts ytterbium and holmium should be present in the composition in the ratio of from about 500 to 1 to about 7 to 1. The most preferred ratio of both ytterbium to erbium and ytterbium to holmium in the mixture is about 20 to 1.

A similar compound having the form .79 $SrCl_2$ .20 $YbCl_3$ .01 $HoCl_3$ is similarly prepared and used to provide a visible green light.

Although strontium chloride is a cubic crystal (having inversion symmetry), the heavy concentration of doping with the rare earth ions (up to 20%) disturbs the symmetry of the crystal in order to produce a crystalline structure wherein the rare earth ions are structured within the crystal so as to not be at a point of cubic symmetry and therefore capable of undergoing electric dipole energy transitions.

A second material strontium yttrium chloride $SrYCl_5$ is prepared in a manner similar to the strontium chloride $SrCl_2$ and similarly doped with ytterbium and either erbium or holmium to form an infrared to visible light converting phosphor.

Although a preferred embodiment of the invention has been described in detail, it is to be understood that various changes, substitutions and alterations can be made therein without departing from the spirit and scope of the invention as defined by the appended claims.

What is claimed is:

1. A composition for converting infrared radiation into visible radiation comprising a crystalline strontium halide doped with rare earth material.

2. A composition for converting infrared radiation into visible radiation as defined by claim 1 wherein the strontium halide is strontium chloride.

3. A composition for converting infrared radiation into visible radiation as set forth in claim 2 wherein the rare earth material includes ytterbium and erbium.

4. A composition for converting infrared radiation into visible radiation as set forth in claim 3 wherein the ratio of said ytterbium to erbium is in the range of from about 100 to 1 to 10 to 1.

5. A composition for converting infrared radiation into visible radiation as set forth in claim 3 wherein the ratio of said ytterbium to erbium as about 20 to 1.

6. A composition for converting infrared radiation into visible radiation as set forth in claim 3 wherein said ytterbium is present in an amount ranging from about 50 atomic percent to about 10 atomic percent and said erbium is present in an amount ranging from about 3.0 atomic percent to about 0.5 atomic percent by said composition.

7. A composition for converting infrared radiation into visible radiation as set forth in claim 3 wherein said ytterbium is present in an amount equal to about 20 atomic percent and said erbium is present in an amount equal to about 1 percent of said composition.

8. A composition for converting infrared radiation into visible radiation as set forth in claim 2 wherein the rare earth material includes ytterbium and holmium.

9. A composition for converting infrared radiation into visible radiation as set forth in claim 8 wherein the ratio of said ytterbium to holmium is in the range of about 500 to 1 to about 7 to 1.

10. A composition for converting infrared radiation into visible radiation as set forth in claim 8 wherein the ratio of said ytterbium to holmium is about 20 to 1.

11. A composition for converting infrared radiation into visible radiation as set forth in claim 8 wherein said ytterbium is present in an amount ranging from about 50 atomic percent to about 10 atomic percent and said holmium is present in an amount ranging from about 1.5 atomic percent to about 0.10 atomic percent of said composition.

12. A composition for converting infrared radiation into visible radiation as set forth in claim 8 wherein said ytterbium is present in an amount equal to about 20 atomic percent and said holmium is present in an amount equal to about 1 atomic percent of said composition.

13. A composition for converting infrared radiation into visible radiation comprising strontium yttrium chloride doped with rare earth material.

14. A composition for converting infrared radiation into visible radiation as set forth in claim 13 wherein the rare earth material includes ytterbium and erbium.

15. A composition for converting infrared radiation into visible radiation as set forth in claim 13 wherein the ratio of said ytterbium to erbium is in the range of from about 100 to 1 to about 10 to 1.

16. A composition for converting infrared radiation into visible radiation as set forth in claim 13 wherein the ratio of said ytterbium to erbium is about 20 to 1.

17. A composition for converting infrared radiation into visible radiation as set forth in claim 13 wherein said ytterbium is present in an amount ranging from about 50 atomic percent to about 10 atomic percent and said erbium is present in an amount ranging from about 3.0 atomic percent to about 0.5 atomic percent of said composition.

18. A composition for converting infrared radiation into visible radiation as set forth in claim 13 wherein said ytterbium is present in an amount equal to about 20 atomic percent and said erbium is present in an amount equal to about 1 atomic percent of said composition.

19. A composition for converting infrared radiation into visible radiation as set forth in claim 13 wherein the rare earth material includes ytterbium and holmium.

20. A composition for converting infrared radiation into visible radiation as set forth in claim 13 wherein the ratio of said yetterbium to holmium is in the range of from about 500 to 1 to about 7 to 1.

21. A composition for converting infrared radiation into visible radiation as set forth in claim 13 wherein the ratio of said ytterbium to holmium is about 20 to 1.

22. A composition for converting infrared radiation into visible radiation as set forth in claim 13 wherein said ytterbium is present in an amount ranging from about 50 atomic percent to about 10 atomic percent and said holmium is present in an amount ranging from about 1.5 atomic percent to about 0.10 atomic percent of said composition.

23. A composition for converting infrared radiation into visible radiation as set forth in claim 13 wherein said ytterbium is present in an amount equal to about 20 atomic percent and said holmium is present in an amount equal to about 1 atomic percent of said composition.

24. A device for converting electric energy into visible radiation comprising:

a gallium arsenide:silicon doped diode; and a coating over said diode including strontium chloride doped with rare earth material, said diode producing infrared radiation when energized by electric energy and said coating converting the infrared radiation into visible radiation.

25. A device for converting electric energy into visible radiation as set forth in claim 24 wherein said coating includes clear plastic material.

26. A device for converting electric energy into visible radiation as set forth in claim 24 wherein the rare earth material includes ytterbium and erbium.

27. A device for converting electric energy into visible radiation as set forth in claim 26 wherein the ratio of said ytterbium to erbium is in the range of from about 100 to 1 to about 10 to 1.

28. A device for converting electric energy into visible radiation as set forth in claim 26 wherein the ratio of said ytterbium to erbium is about 20 to 1.

29. A device for converting electric energy into visible radiation as set forth in claim 26 wherein said ytterbium is present in an amount ranging from about 50 atomic percent to about 10 atomic percent and said erbium is present in an amount ranging from about 3.0 atomic percent to about 0.5 atomic percent of said composition.

30. A device for converting electric energy into visible radiation as set forth in claim 26 wherein said ytterbium is present in an amount equal to about 20 atomic percent and said erbium is present in an amount equal to about 1 percent of said composition.

31. A device for converting electric energy into visible radiation as set forth in claim 24 wherein the rare earth material includes ytterbium and holmium.

32. A device for converting electric energy into visible radiation as set forth in claim 31 wherein the ratio of said ytterbium to holmium is in the range of from about 500 to 1 to about 7 to 1.

33. A device for converting electric energy into visible radiation as set forth in claim 31 wherein the ratio of said ytterbium to holmium is about 20 to 1.

34. A device for converting electric energy into visible radiation as set forth in claim 31 wherein said ytterbium is present in an amount ranging from about 50 atomic percent to about 10 atomic percent and said holmium is present in an amount ranging from about 1.5 atomic percent to about 0.10 atomic percent of said compositon.

35. A device for converting electric energy into visible radiation as set forth in claim 31 wherein said ytterbium is present in an amount equal to about 20 atomic percent and said holmium is present in an amount equal to about 1 atomic percent of said compostiion.

36. A device for converting electric energy into visible radiation comprising:

a gallium arsenide:silicon doped diode; and a coating over said diode including strontium yttrium chloride doped with rare earth material.

37. A device for converting electric energy into visible radiation as set forth in claim 36 wherein said rare earth material includes ytterbium and erbium.

38. A device for converting electric energy into visible radiation as set forth in claim 36 wherein said rare earth material includes ytterbium and holmium.

References Cited

UNITED STATES PATENTS 3,245,847 4/1966 Pizzarello .......... 352—62.3

JOHN T. GOOLKASIAN, Primary Examiner

M. E. McCAMISH, Assistant Examiner

U.S. Cl. X.R.

117—33.5 E; 148—33.4; 252—1, 62.3 GA; 317—234 R